US010809685B2

(12) United States Patent
Fawaz et al.

(10) Patent No.: US 10,809,685 B2
(45) Date of Patent: Oct. 20, 2020

(54) DISHWASHER WITH CLOUD CONNECTED CAMERAS

(71) Applicant: Midea Group Co., Ltd., Beijiao, Shunde, Foshan (CN)

(72) Inventors: Bassam Fawaz, Louisville, KY (US); Robert M. Digman, Goshen, KY (US); Qiang Liu, San Jose, CA (US)

(73) Assignee: MIDEA GROUP CO., LTD., Beijiao, Shunde, Foshan, Guangdong (CN)

( * ) Notice: Subject to any disclaimer, the term of this patent is extended or adjusted under 35 U.S.C. 154(b) by 0 days.

(21) Appl. No.: 16/356,573

(22) Filed: Mar. 18, 2019

(65) Prior Publication Data

US 2020/0301382 A1    Sep. 24, 2020

(51) Int. Cl.

| G05B 19/042 | (2006.01) |
|---|---|
| G06N 20/00 | (2019.01) |
| G06T 7/70 | (2017.01) |
| G06K 9/00 | (2006.01) |
| G06T 7/13 | (2017.01) |
| H04N 5/247 | (2006.01) |

(52) U.S. Cl.
CPC ....... *G05B 19/042* (2013.01); *G06K 9/00624* (2013.01); *G06N 20/00* (2019.01); *G06T 7/13* (2017.01); *G06T 7/70* (2017.01); *G05B 2219/2613* (2013.01); *G06T 2207/10004* (2013.01); *G06T 2207/10028* (2013.01); *G06T 2207/10044* (2013.01); *G06T 2207/20081* (2013.01); *H04N 5/247* (2013.01)

(58) Field of Classification Search
CPC .......... G05B 19/042; G05B 2219/2613; G06K 9/00624; G06N 20/00; H04N 5/247; G06T 2207/20081; G06T 2207/10028; G06T 7/70; G06T 7/13; G06T 2207/10044; G06T 2207/10004
USPC ........................................................ 700/275
See application file for complete search history.

(56) References Cited

U.S. PATENT DOCUMENTS

| 5,131,419 A | 7/1992 | Roberts |
| 6,675,818 B1 | 1/2004 | Schrott et al. |
| 7,842,137 B2 | 11/2010 | Classen et al. |
| 7,935,194 B2 | 5/2011 | Rolek |
| 7,959,744 B2 | 6/2011 | Sundaram et al. |
| 8,229,161 B2 | 7/2012 | Hudnut et al. |
| 8,509,473 B2 | 8/2013 | Wagner |
| 8,696,827 B2 | 4/2014 | Ashrafzadeh et al. |

(Continued)

FOREIGN PATENT DOCUMENTS

| CN | 107468196 A | 12/2017 |
| CN | 107485356 A | 12/2017 |

(Continued)

OTHER PUBLICATIONS

LG Electronics, LG Connected Appliances Lead Home Kitchens Into the Future: Network of Appliances Offers Seamless Connectivity with LG InstaView ThinQ Refrigerator, EasyClean Oven Range and QuadWash Dishwasher, PR Newswire, Jan. 7, 2018.

(Continued)

*Primary Examiner* — Jigneshkumar C Patel
(74) *Attorney, Agent, or Firm* — Middleton Reutlinger (57) ABSTRACT

Systems and methods for monitoring dish ware position and modifying the wash and dry cycle of a dishwasher by capturing and analyzing image data utilizing a plurality of cloud-connected cameras.

20 Claims, 8 Drawing Sheets

(56) References Cited

U.S. PATENT DOCUMENTS

| | | |
|---|---|---|
| 9,468,956 B2 | 10/2016 | Simundic et al. |
| 2007/0272272 A1 | 11/2007 | Choi et al. |
| 2010/0294311 A1 | 11/2010 | Classen et al. |
| 2011/0017235 A1 | 1/2011 | Berner et al. |
| 2012/0138092 A1 | 6/2012 | Ashrafzadeh et al. |
| 2016/0367107 A1 | 12/2016 | Ellingson et al. |
| 2017/0172371 A1 | 6/2017 | Engesser et al. |
| 2017/0202426 A1* | 7/2017 | Bosen .................. A47L 15/006 |
| 2018/0107879 A1 | 4/2018 | Laput et al. |
| 2018/0242812 A1* | 8/2018 | Armellin ............. A47L 15/4206 |
| 2020/0003659 A1* | 1/2020 | Davies ............... G01R 19/2513 |

FOREIGN PATENT DOCUMENTS

| | | | |
|---|---|---|---|
| CN | 107729816 A | 2/2018 | |
| CN | 108852239 A | 11/2018 | |
| CN | 109247886 A * | 1/2019 | ......... A47L 15/0049 |
| CN | 109247886 A | 1/2019 | |
| CN | 109316144 A | 2/2019 | |
| DE | 10048081 A1 | 4/2002 | |
| EP | 0943287 A1 | 9/1999 | |
| EP | 1635167 A1 | 3/2006 | |
| JP | 2003235781 A | 8/2003 | |
| WO | WO2011080232 A1 | 7/2011 | |
| WO | WO2012173479 A1 | 12/2012 | |
| WO | WO2016008699 A1 | 1/2016 | |
| WO | WO2017032629 A1 | 3/2017 | |
| WO | WO2018044094 A1 | 3/2018 | |
| WO | WO2018114363 A1 | 6/2018 | |

OTHER PUBLICATIONS

Written Opinion and International Search Report in PCT Application No. PCT/CN2019/097378 dated Dec. 18, 2019.

* cited by examiner

DISHWASHER WITH CLOUD CONNECTED CAMERAS

BACKGROUND

Modern dishwashers have many systems and integrated sensors that are designed to provide superior cleaning of dirty dishes during a wash cycle. Some dishwashers are equipped with various sensors that are capable of determining the position of items on the various dishwasher racks and controlling a wash cycle based on those positions. Some dishwashers have a predefined wash function and trajectory where water is sprayed throughout the racks regardless of their content. The energy consumed by the dishwashing appliance is therefore directed to all areas of the interior dishwasher racks regardless of the content of the dishwasher.

Some prior art devices use limited vision systems to approximate or estimate the dishware disposed on the racks within a dishwasher cavity and thus tailor the dishwasher cycle accordingly. However these prior art systems are limited in their ability to detect dish ware or containers that have moved or flipped over during a wash cycle, which is a particular problem with light plastic containers. When these containers overturn they tend to fill with wash water and thus don't get completely clean, and hold soapy or soiled wash water inside the dishwasher cavity during the remainder of the wash cycle. This problem is particularly acute in modern dishwasher systems that operate with reduced water volumes, since the water held within the overturned container is needed for system operation.

Thus there is a need in the art for a dishwasher have dish ware sensing capability within the dishwasher cavity that has the ability to detect if containers have flipped during the wash cycle as a result of jet impingement. In these instances a user may then be alerted to adjust the out of place containers so they do not hold water that is needed by the system.

Additionally, there is a further need in the art for a dishwasher have dish ware sensing capability within the dishwasher cavity that has the ability to modify detergent dosing or metering in a bulk dispense setup based on the dish ware load size and arrangement.

SUMMARY

The present disclosure is related to systems and methods for sensing and monitoring the location and arrangement of dish ware on the various racks of a dishwasher appliance. The system disclosed herein utilizes a plurality of sensors disposed at a plurality of locations within the dishwasher cavity capture images or imaging data and transmit that data to a remote server or cloud-based computing platform for analysis. In various embodiments the imaging data collected is analyzed by an analysis system that may include a deep learning algorithm to detect the position of dish ware on the various racks of the dishwasher. In some embodiments the sensors employed may be cameras, RF sensors (radio frequency transmitters and detectors) and LIDAR sensors (light detection and ranging) to detect and determine dish ware location and arrangement.

In various embodiments, the systems and methods disclosed herein provide a system that analyzes images or image data from a plurality of sensors arrayed within a dishwasher cavity to determine the initial location of the dish ware therein and adjust or modify a dish washing cycle or other wash/rinse/dry variable depending upon the location of various items. In other embodiments, image data may be taken at the initiation of a wash cycle and then compared with imaging data sensed later in the dish washing cycle to determine an out-of-place or overturned piece of dish ware.

In other embodiments, the system and methods disclosed herein may be used to analyze the locations and orientations of dish ware in quadrants or sections of a dish washer cavity and then adjust wash/rinse/dry cycle variables according to the items detected in a particular section or quadrant. In some aspects the sensors employed may be capable of detecting the types of materials of variously located items of dish ware and once analyzed, the system may alter the wash cycle of the dishwasher accordingly.

In other aspects of the disclosure the system may prompt a user to stop the wash cycle of the dishwasher to re-orient an out of place or overturned item that is holding water and thus reducing the effectiveness of the wash cycle. In other embodiments the system may use a remotely obtained image provided by a user via a communications interface to conduct an analysis of the dishwasher load and modify the wash cycle, or prompt a user to take corrective action.

As used herein for purposes of the present disclosure, the term "appliance" should be understood to be generally synonymous with and include any device that consumes electrical power and can be connected to an electrical circuit, for example one used in a residential or commercial setting to accomplish work. The appliances referred to herein may include a plurality of electrically operated components powered by the circuit and further may include a processor or processors that operate the appliance.

The term "dishwasher" should be understood to be an appliance that includes a "processor" as that term is understood below, for operating and controlling the various electrical, electro-mechanical and mechanical components included in the dishwasher, and a door enclosing an interior cavity into which dish ware may be placed for cleaning. A dishwasher may also comprise a plurality of racks disposed within the cavity as well as a water jet system for directing cleaning water onto dish ware and a soap and rinse aid dispensing system for supplying soap and rinse aid to the cavity during a wash cycle.

The terms "images" or alternatively "imaging data" should be understood to refer to all types of digital or analog electronic data, and/or digital or analog electrical signals that may be utilized either before or after additional signal processing, to interpret the presence and/or type of dish ware or other object present in an area being sensed. Images or imaging data may refer to all types of signals, analog or digital produced and provided by imaging sensors such as optical sensors, LIDAR sensors, RF sensors, or any other type of electrical or electronic sensor used to detect and analyze objects in space.

The term "Internet" or synonymously "Internet of things" refers to the global computer network providing a variety of information and communication facilities, consisting of interconnected networks using standardized communication protocols. The appliances, controllers and processors referred to herein may be operatively connected to the Internet.

As used herein for purposes of the present disclosure, the term "wireless communication" generally describes apparatus and systems relating to the wireless transmission of a signal. Any of a wide variety of wireless transmission devices and communications protocols may be employed in the system of the invention, including analog and digital transmission systems. Exemplary but non-limiting wireless transmitters that may form a part of the invention include radio transmitters, cellular transmitters, LTE and LTE advanced systems, ZigBee™, Wi-Fi, and Bluetooth transmitters. Additionally, a plurality of wireless network and transmission systems may be employed without departing from the scope of the invention, including, but not limited to, wireless personal area networks, local area networks, mesh networks, metropolitan area and global area networks.

The term "processor" or alternatively "controller" is used herein generally to describe various apparatus relating to the operation of one or more computers, web servers, or databases. A processor can be implemented in numerous ways (e.g., such as with dedicated hardware) to perform various functions discussed herein. A "processor" is one example of a controller which employs one or more microprocessors that may be programmed using software instructions (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" or "instructions" are used herein in a generic sense to refer to any type of computer code (e.g., software or microcode) that can be employed to program one or more processors or controllers.

The term "user interface" as used herein refers to an interface between a user or operator and one or more devices that enables interaction between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), smartphones, watches, tablets, personal computing platforms, touch screens, microphones and other types of sensors that may receive some form of human-generated stimulus and generate a signal in response thereto. Furthermore, user interfaces can encompass interactive web pages and other user prompts, whether provided on stand alone computing platforms or mobile devices.

The terms "communications interface" or alternatively "communications link" are generally meant to include in digital or other communication with any other part of the system via a wireless or wired communication protocol. A communication interface may be between two devices or components and may be accomplished by a separate networking system. Communication interfaces may be provided to transfer data between a web server, a database, a computer, a mobile or handheld device, or any other control system, a consumer operated external device, a wireless local area network (WLAN), or any other communication system. The communication links disclosed and described in this specification may be integrated within various system components or alternatively may be separate electronic systems.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description only and should not be regarded as limiting.

The accompanying drawings, which are incorporated and form a part of the specification illustrate exemplary, but non-limiting, embodiments of the disclosure, and together with the description, serve to explain the principles of the disclosure.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein.

DETAILED DESCRIPTION

Referring to drawing FIGS. 1-4, and in accordance with various aspects and embodiments of the invention, a system 10 for sensing and monitoring the location and arrangement of dish ware 2, 3 on the various racks 102 of a dishwasher 100 is described. In various embodiments the dishwasher 100 in which system 10 is implemented may include a controller 200 integral to dishwasher 100 that operates dishwasher 100 by controlling and monitoring the various components thereof, and of system 10, as will be described in detail herein below.

Figure 1:
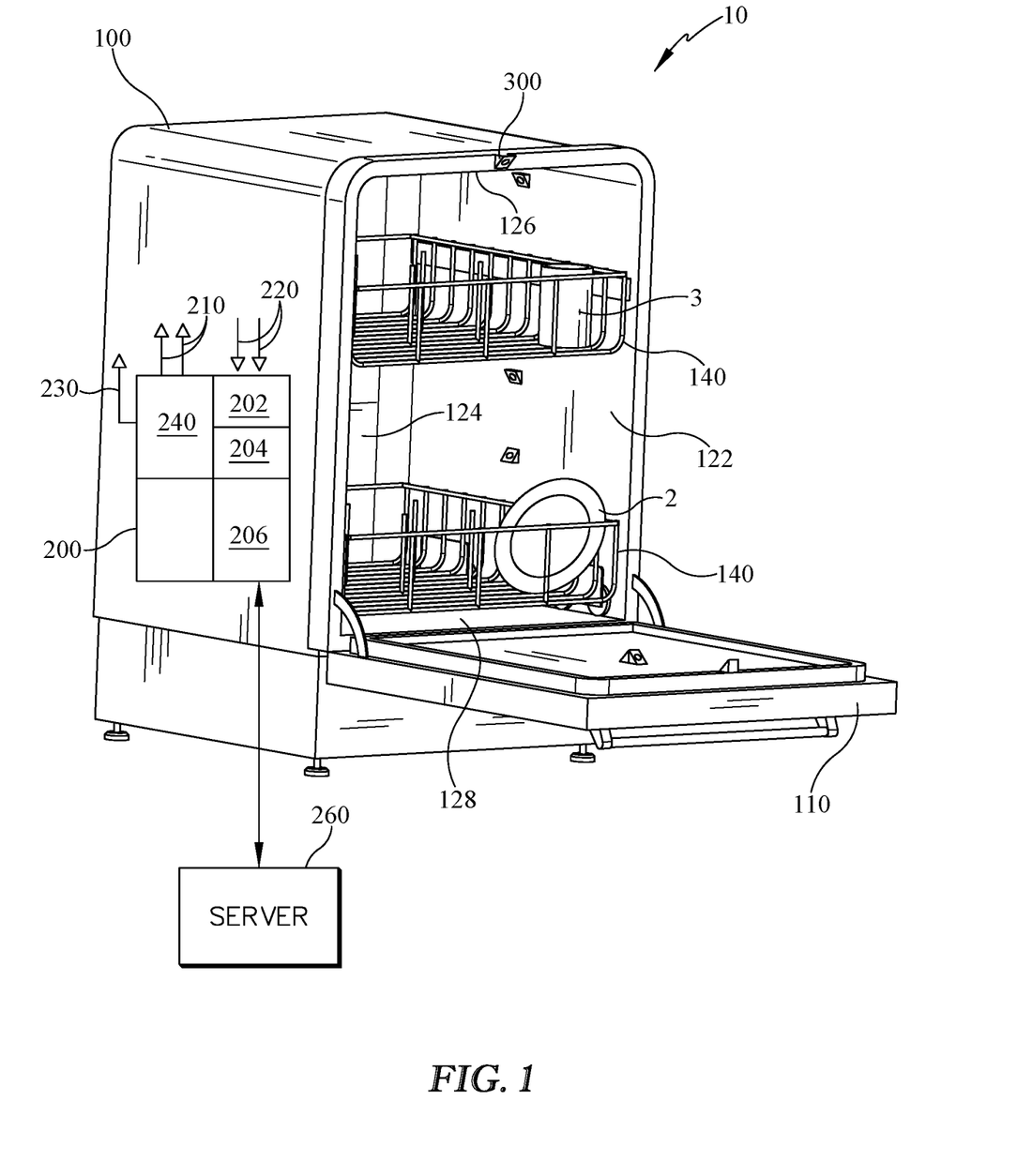
FIG. 1 is an isometric diagram of a dishwasher in accordance with various embodiments.

FIG. 1 illustrates an exemplary dishwasher 100 hardware environment for implementing system 10 for sensing and monitoring the location and arrangement of dish ware 2, 3. The dishwasher 100 may include a controller 200, a processor or processors 202 and memory 204. Dishwasher 100 may further comprise a plurality of signal outputs 210 and signal inputs 220 that may be operatively connected to a plurality of dishwasher 100 components to monitor and direct system 10 operation. Furthermore, in some embodiments controller 200 may include a wireless or hard-wired communications interface 230 that enables controller 200 to communicate with external devices or communications networks such as the internet or a remotely located server 260, that may be integrated into system 10.

Additionally, controller 200 may be equipped with an operator or user interface 240 to provide audible or visual feedback to a user as well as enable a user the ability to provide instructions or commands to controller 200 and thus dishwasher 100. Exemplary but non-limiting user interfaces that may be employed include a mouse, keypads, touchscreens, keyboards, switches, buttons and/or touch pads. Any user interface may be employed for use in the invention without departing from the scope thereof. It will be understood that FIG. 1 constitutes, in some respects, an abstraction and that the actual organization of the components of dishwasher 100 and controller 200 may be more complex than illustrated.

The processor 202 may be any hardware device capable of executing instructions stored in memory 204 or data storage 206 or otherwise processing data. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the communication interface 230.

The communications interface 230 may include one or more devices for enabling communication with other hardware devices. For example, the communication interface 230 may include a network interface card (NIC) configured to communicate according to the Ethernet protocol. Additionally, the communication interface 230 may implement a TCP/IP stack for communication according to the TCP/IP protocols. Various alternative or additional hardware or configurations for the communication interface 230 will be apparent.

The storage 206 may include one or more machine-readable storage media such as read-only memory (ROM), random-access memory (RAM), magnetic disk storage media, optical storage media, flash-memory devices, or similar storage media. In various embodiments, the storage 206 may store instructions for execution by the processor 202 or data upon with the processor 202 may operate. For example, the storage 206 may store a base operating system for controlling various basic operations of the hardware. Other instruction sets may also be stored in storage 206 for executing various functions of system 10, in accordance with the embodiments detailed below.

It will be apparent that various information described as stored in the storage 206 may be additionally or alternatively stored in the memory 204. In this respect, the memory 204 may also be considered to constitute a "storage device" and the storage 206 may be considered a "memory." Various other arrangements will be apparent. Further, the memory 204 and storage 206 may both be considered to be "non-transitory machine-readable media." As used herein, the term "non-transitory" will be understood to exclude transitory signals but to include all forms of storage, including both volatile and non-volatile memories.

While the controller 200 is shown as including one of each described component, the various components may be duplicated in various embodiments. For example, the processor 202 may include multiple microprocessors that are configured to independently execute the methods described herein or are configured to perform steps or subroutines of the methods described herein such that the multiple processors cooperate to achieve the functionality described herein. Further, where the controller 200 is implemented in a cloud computing system, the various hardware components may belong to separate physical systems. For example, the processor 202 may include a first processor in a first server and a second processor in a second server.

Referring now to FIGS. 1-4, in accordance with some embodiments, dishwasher 100 may include a hinged door 110 that opens to expose dishwasher 100 cavity 120, into which dish ware 2, 3, is placed for cleaning. Cavity 120 is defined by door 120, a pair of spaced side walls 122, a rear wall 124, and top 126 and bottom wall 128. Dishwasher 100 may also include rack 140, or a plurality thereof, that are spaced within cavity 120 and on which dish ware 2, 3 is disposed for cleaning. As is known in the art racks 140 may include wheels or runners such that they slide outwardly from cavity 140 when door 110 is open for access to load and remove dish ware 2, 3. Additionally, dishwasher 100 is typically equipped with a liquid circulation system (not shown) for introducing, directing, and circulation liquid and wash aids and solutions such as detergents, rinse aid and the like, throughout cavity 110 during a wash cycle. The liquid circulation system is typically provided with a plurality of sprayers, movable or circulating spray arms or the like for directing wash and rinse solution onto dish ware 2, 3.

In one non-limiting exemplary embodiment for purposes of illustration in this specification, dishwasher 100 includes at least one dish ware sensor 300, or a plurality thereof, arranged in and secured at a plurality of locations in cavity 120. Sensors 300 may in various embodiments of the invention be optical sensors, cameras, RF (radio frequency) sensors, LIDAR modules, infrared sensors or other equivalent sensors capable of detecting the presence and location of dish ware 2, 3. In some embodiments a plurality of camera sensors 300 are secured at a plurality of locations throughout cavity 120 of dishwasher 100 to detect and monitor the location of dish ware disposed on racks 140. Sensors 300 include an output 302 operatively coupled to an input 220 of controller 200, the output 302 being representative of the view of dish ware 2, 3, from sensor 300 for further processing. In various embodiments processor 200 provides image data captured from sensors 300 to remote server 260 through operation of wireless communications interface 230 for additional processing.

Figure 2:
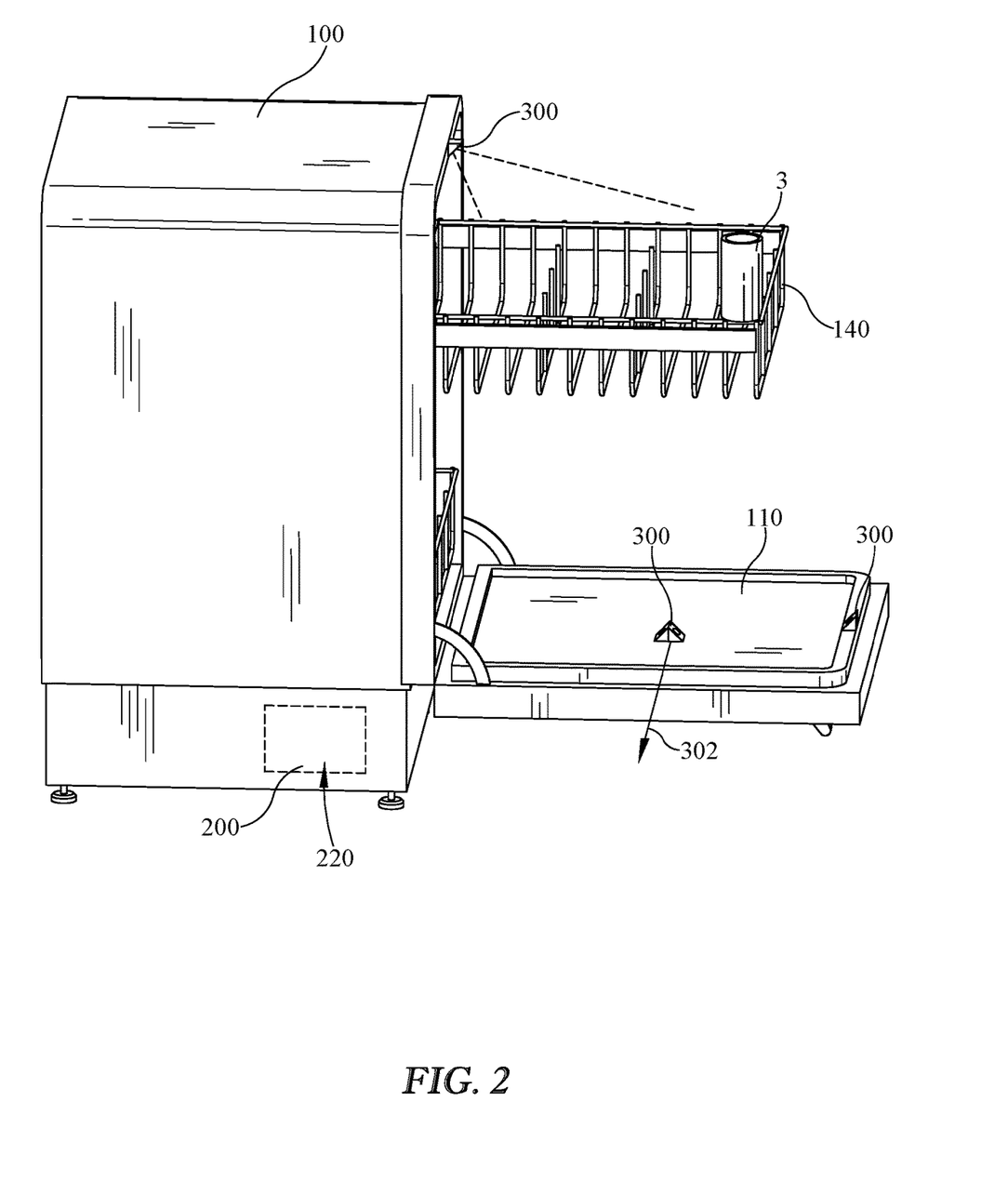
FIG. 2 is a side view of an open dishwasher in accordance with various embodiments.
Figure 3:
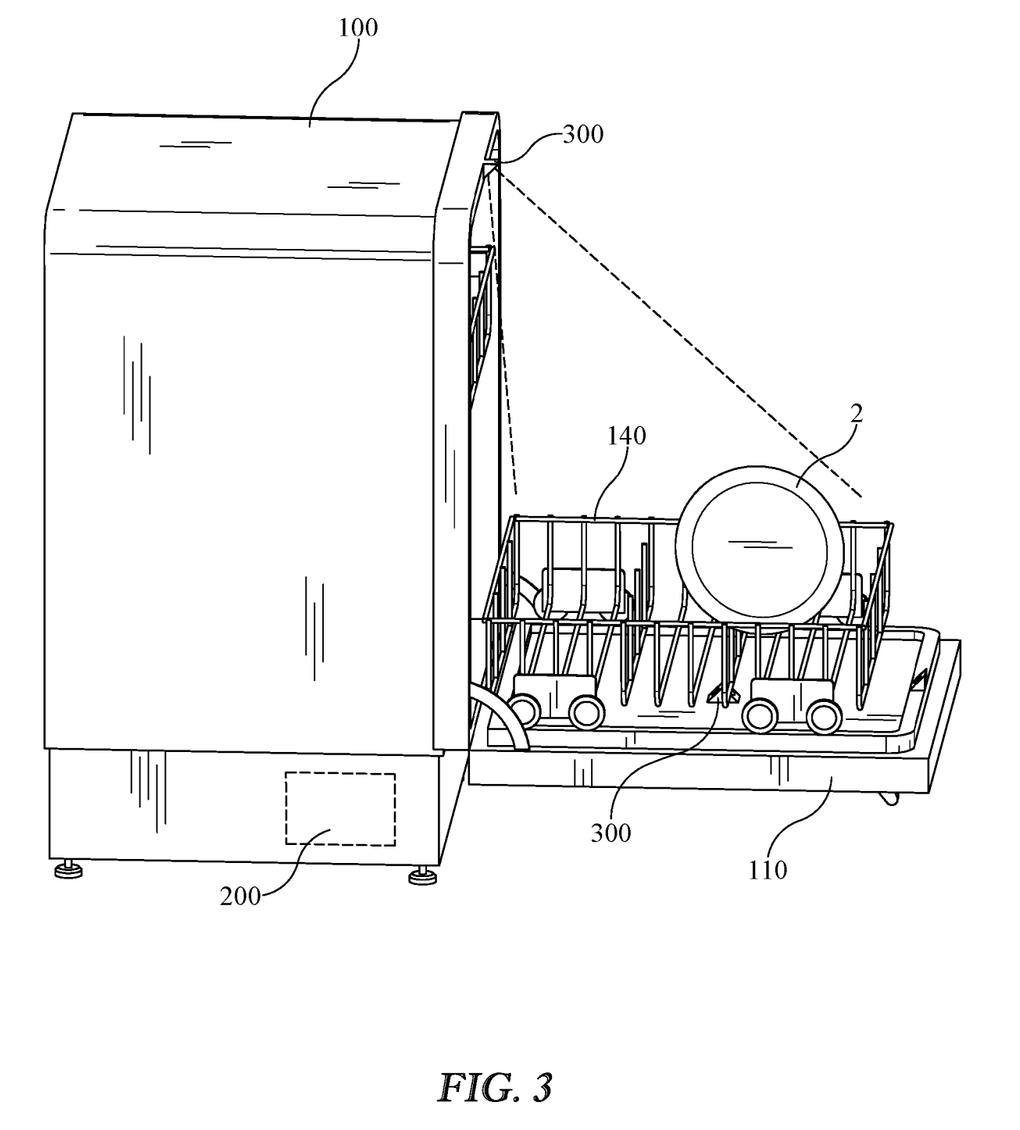
FIG. 3 is a side view of an open dishwasher in accordance with various embodiments.
Figure 4:
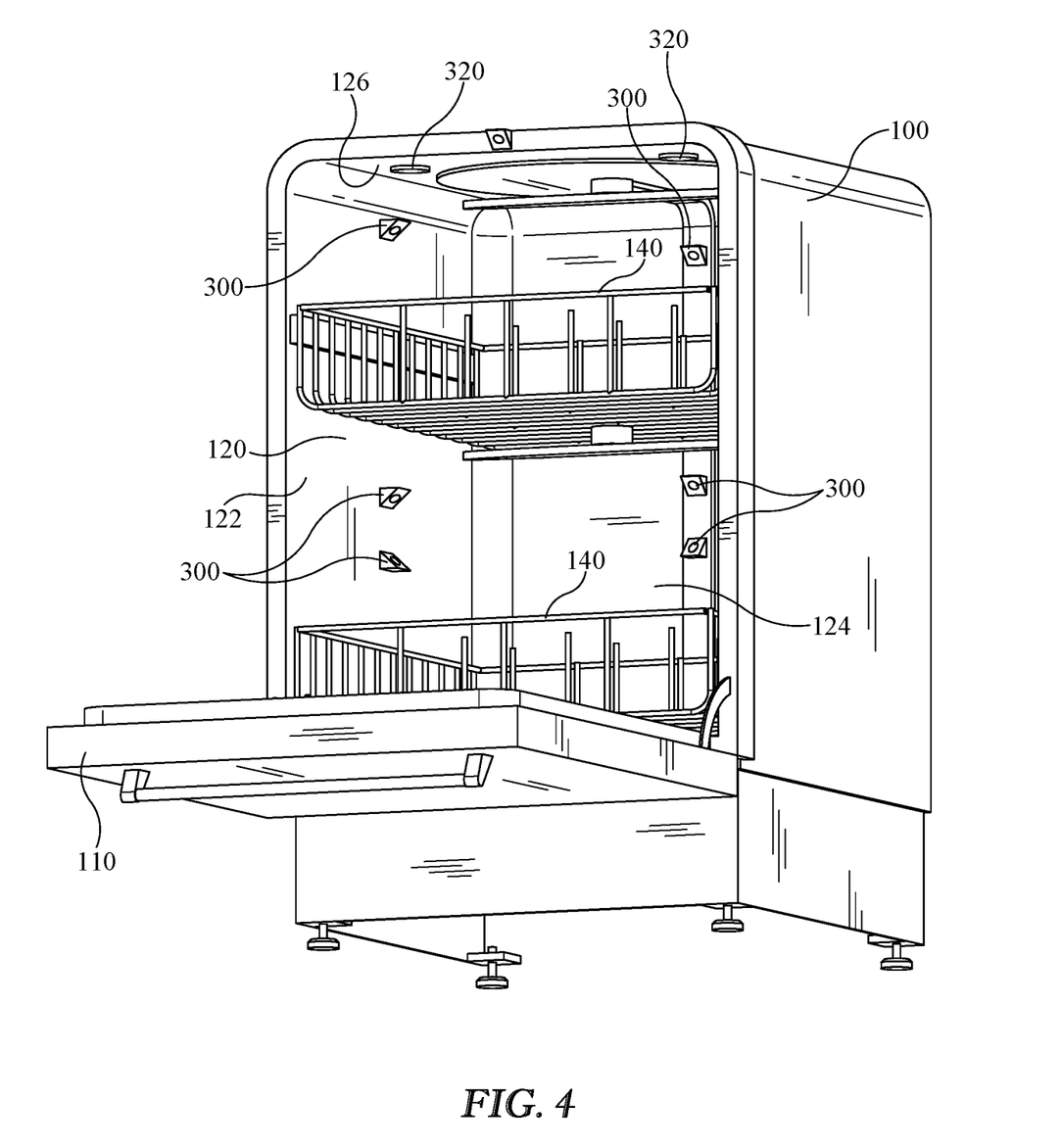
FIG. 4 is an isometric view of an open dishwasher in accordance with various embodiments.
Figure 5:
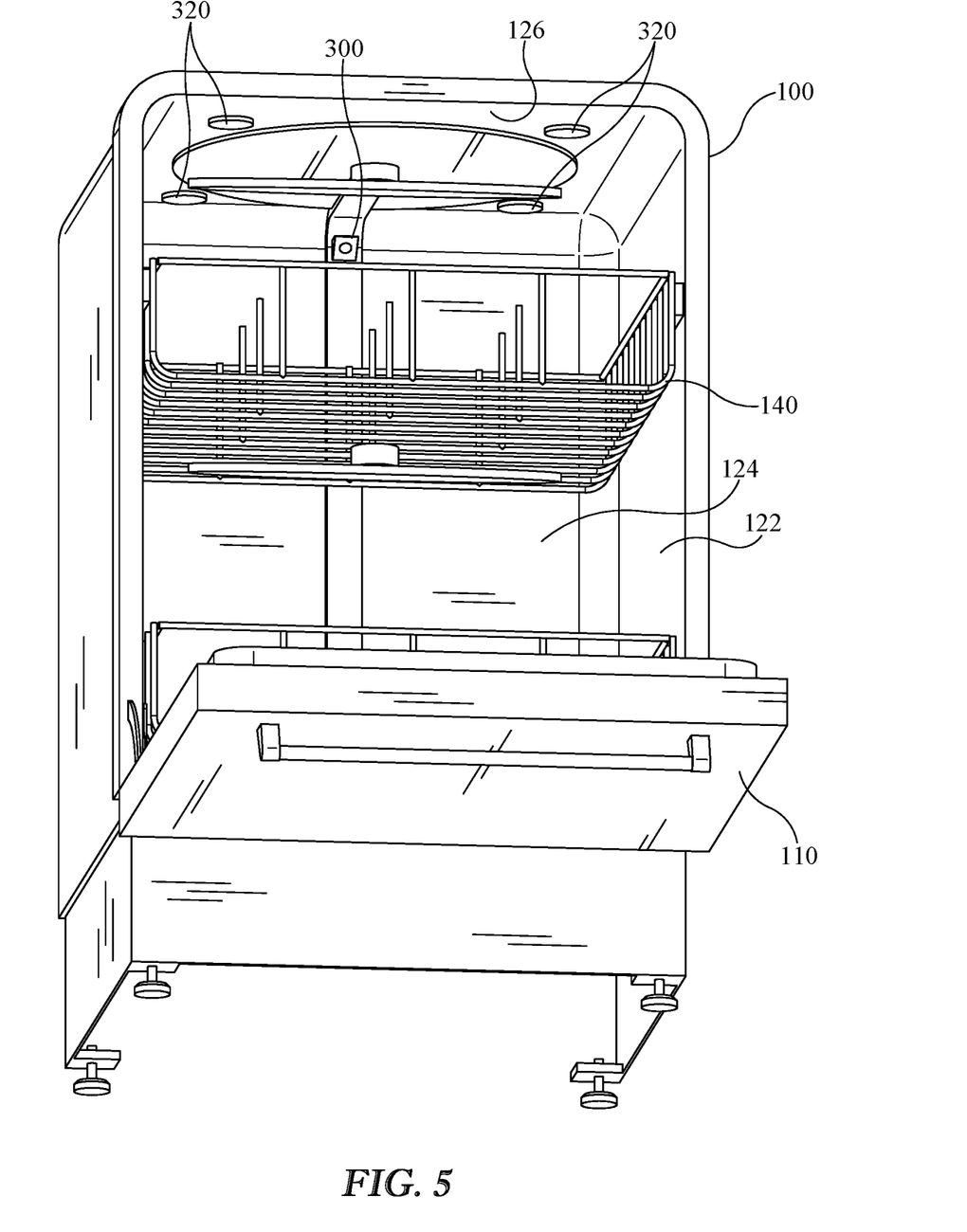
FIG. 5 is an isometric view of an open dishwasher in accordance with various embodiments.

As best depicted in FIGS. 2-4 and in accordance with various non-limiting embodiments cameras 300 may be arranged to provide a view of dish ware 2, 3 on racks 140 from above, below, and on both sides thereof. For example, cameras or sensors 300 are secured at multiple locations along side walls 122, top 126, and bottom 128. Sensors 300 may also be placed on door 110 interior, to obtain a view of dish ware 2, 3 from the front of dishwasher 100. Furthermore, as best depicted in FIGS. 2 and 3, a sensor 300 may be disposed proximate the top of dishwasher 100, on the exterior thereof outside cavity 120, such that an image may be taken of the top rack 140 and bottom rack 140 when racks 140 are loaded but extended out of cavity 120. In this embodiment the natural light provided by the environment or room interior in which dishwasher 100 is located may be utilized to obtain an image of dish ware 2, 3, placed on racks 140 prior to closing door 110. This feature of the invention provides processor 200 with a "before' image of dish ware 2, 3 that can be compared to a subsequent image to determine whether dish ware 2, 3 has moved or become dislodged due to jet impingement.

A plurality of lights 320 may be mounted at a plurality of locations on dishwasher sides 122, top 126, back 124 and bottom 128 to provide light during operation of dishwasher 100, since once door 110 is closed no ambient light is available for sensors 300 that require it. In some embodiments, a single diffuse light source may be secured in cavity 120, for example recessed in top 126 thereof. In these embodiments, multiple images can be procured by cameras 300 during dishwasher 100 operation and then analyzed by system 10, as detailed herein below.

Figure 6:
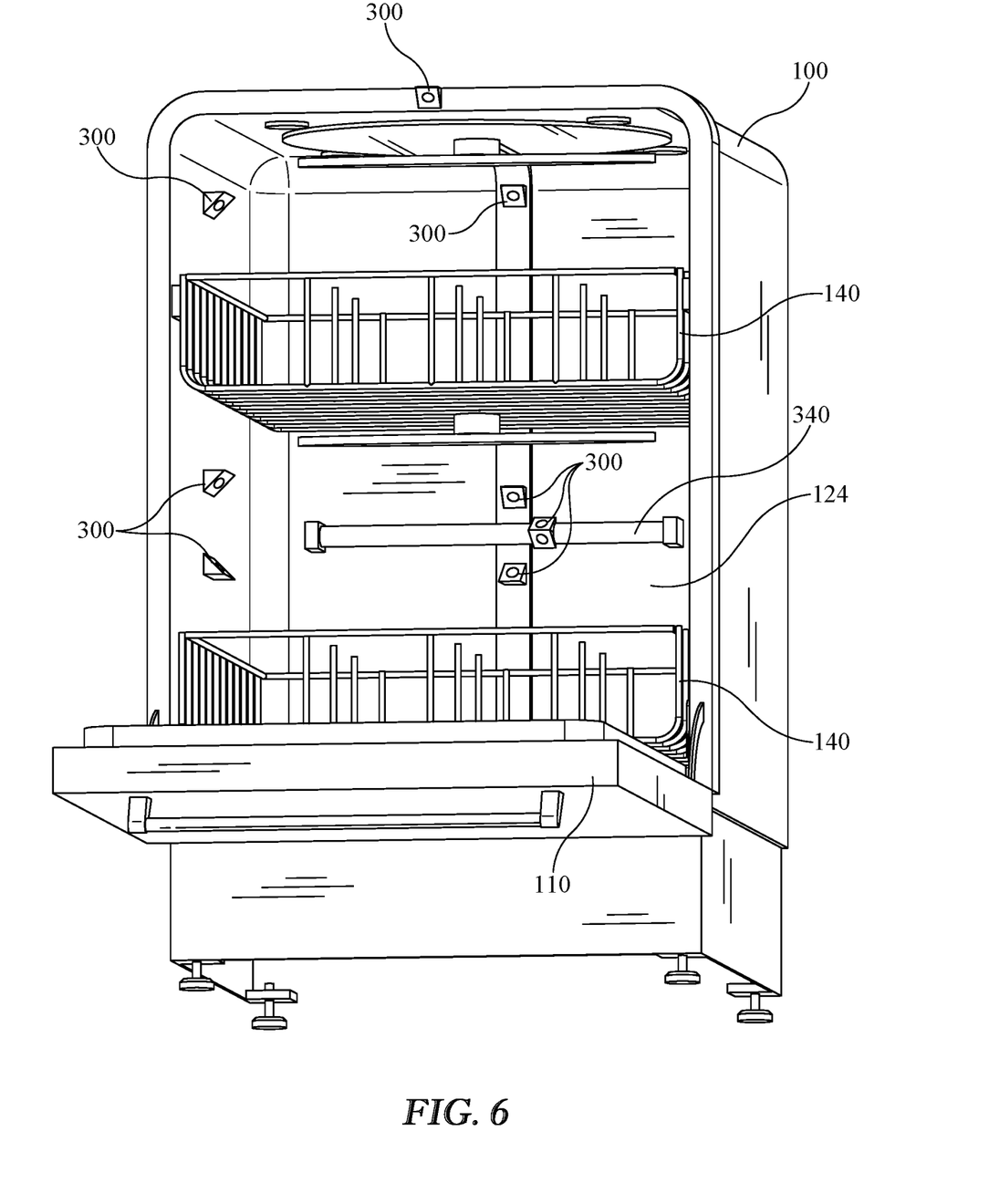
FIG. 6 is an isometric view of an open dishwasher in accordance with various embodiments.
Figure 7:
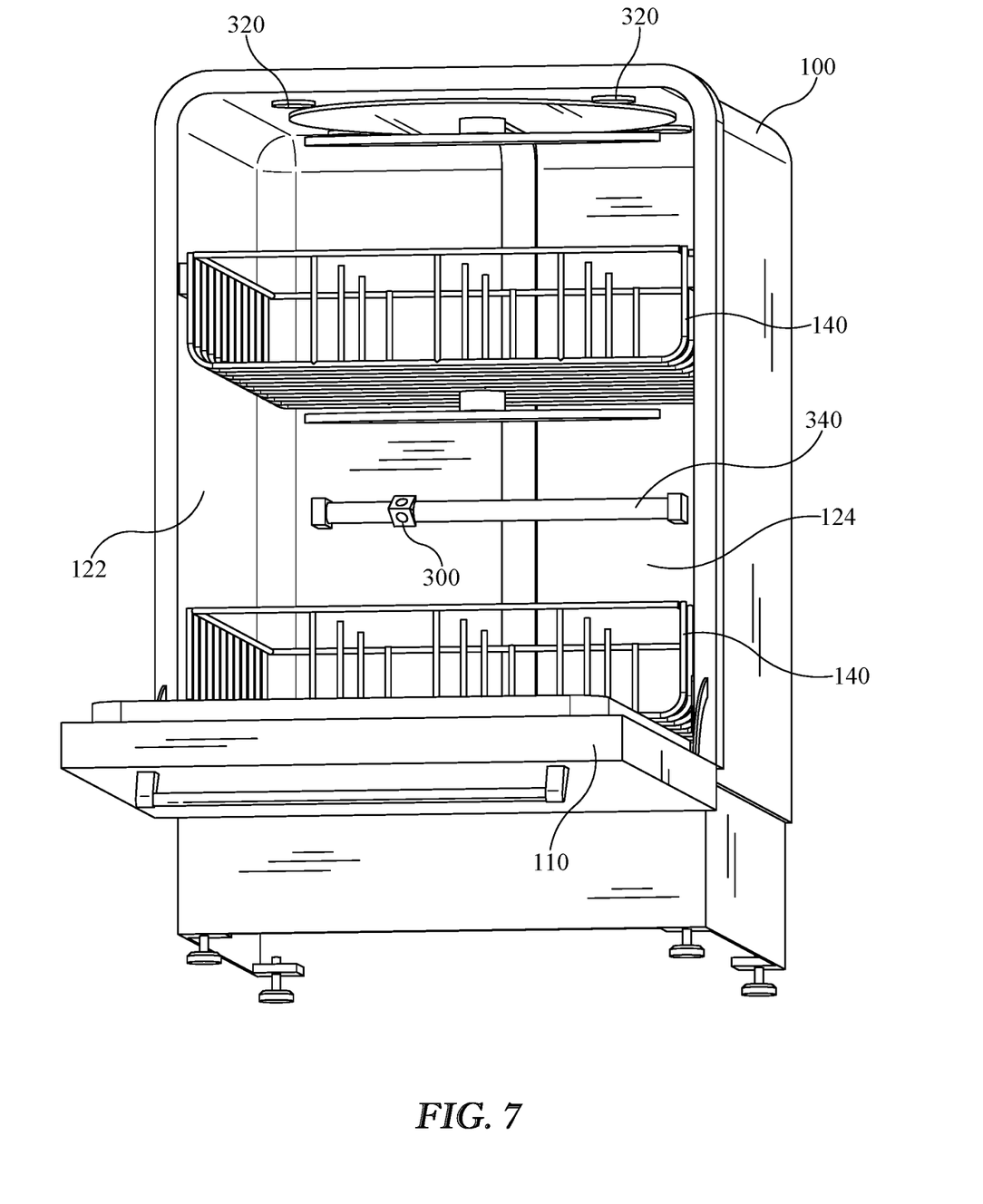
FIG. 7 is an isometric view of an open dishwasher in accordance with various embodiments.
Figure 8:
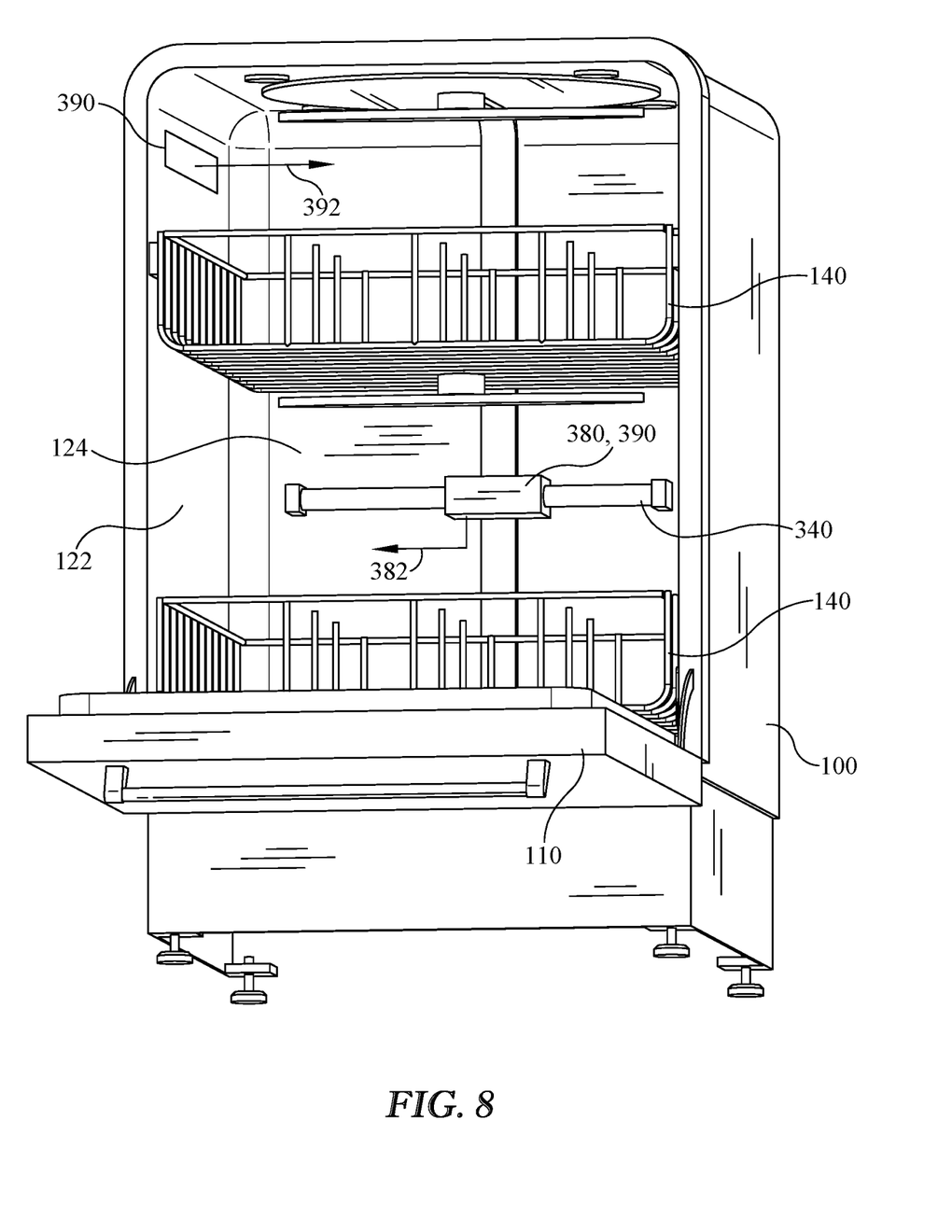
FIG. 8 is an isometric view of an open dishwasher in accordance with various embodiments.

Referring now to FIGS. 6 and 7 and in accordance with various embodiments a horizontally mounted gantry 340 may be disposed along rear wall 124. A sensor 300, or a plurality thereof may be mounted on gantry 340 whereby gantry 340 moves sensor 300 horizontally across substantially the entire width of rear wall 124 during dishwasher operation so that a plurality of images of dish ware 2, 3 can be taken. In some embodiments a pair of sensors 300 may be mounted on gantry 340, one looking upwardly at upper rack 140 and one looking downwardly at lower rack 140 so that images may be take of all dish ware 2, 3 on each rack. In this fashion essentially all dish ware 2, 3 present on racks 140 can be monitored by sensors 300 mounted on gantry 340 during operation of dishwasher 100. The movement of sensors 300 along gantry 340 may be controlled by an output 210 of processor 200, thereby permitting timed control of images taken by sensors 300 during dishwasher 100 operation. Gantry 340 may be operated by a servomotor, linear actuator, or equivalent mechanism without departing from the scope of the present invention. Additionally and alternatively gantry 340 may be mounted along side 122 or rear 124 walls in a vertical orientation such that sensors are moved upwardly and downwardly when gantry 340 is operated.

In a yet further embodiment and in accordance with some aspects of the invention a LIDAR (Laser imaging detection and ranging) imaging module 380 or RF (radio frequency) sensor module 390 may be mounted or secured to gantry 340 to monitor dish ware 2, 3 during dishwasher 100 operation. RF sensor 390 may be mounted or secured to a fixed location within cavity 120, or mounted on gantry 340. LIDAR module 380 includes an output 382 representative of an image of dishware 2, 3, in dishwasher 100 that is operatively coupled to an input 220 of processor 200. In various embodiments processor 200 provides image data captured from LIDAR module 380 to remote server 260 through operation of wireless communications interface 230 for additional processing. Similarly, RF sensor 390 includes an output 392 representative of an image of dishware 2, 3, in dishwasher 100 that is operatively coupled to an input 220 of processor 200. Processor 200 provides image data captured from RF sensor 390 to remote server 260 through operation of wireless communications interface 230 for additional processing.

In operation, system 10 is capable of capturing an image of dish ware 2, 3 contained within a loaded dishwasher 100 prior to beginning a wash cycle and comparing it with subsequent images captured during the cycle. In some aspects and embodiments processor 200 may provide an output 210 to command sensors 300 to capture an image of dish ware 2, 3. This image capture command may be provided just prior to the initiation of a wash cycle, or even immediately following the initiation of a wash cycle. In those embodiments where a sensor 300 is mounted externally of dishwasher 100 cavity 120 as depicted in FIGS. 2 and 3, a user may be able to initiate an image capture of racks 140 by selecting an image capture command through appropriate selections on operator interface 240. Alternatively, when a user selects a wash cycle processor 200 may prompt a user via operator interface 240 to extend racks 140 to capture images of dish ware 2, 3, arrange there on prior to closing door 110 and initiating a wash cycle.

In various embodiments the images of dish ware 2, 3, captured by sensors 300 is transmitted via communications interface 230 to a remote server such as a cloud server 260 or other remote computing platform for image analysis. The images provided for an individual dish washer 100 can then be analyzed by a deep learning algorithm to classify various items of dish ware and log their locations in a load analysis. Once the load analysis has taken place, server 260 can then relay wash cycle adjustment instructions to dishwasher 100 via communications interface 230. In an exemplary but non-limiting embodiment, where sensors 300 capture images indicating a preponderance of light weight plastic dish ware 2 on a given rack, or even in a predetermined area or quadrant of dishwasher cavity 120, the analysis system may provide instructions through server 260 to operate the spray nozzles directing cleaning solution to that area at a reduced jet pressure or velocity, or direction during the various wash and rinse cycles for a given dishwasher cycle. In these embodiments system 10 can customize a wash cycle based on the type of dish ware 2, 3 placed on racks 140 thereby avoiding or at least reducing the problematic overturning of light weight re-sealable plastic containers such commonly used to store food items.

In some aspects and embodiments the images or imaging data provided by sensors 300 for a given dishwasher 100 load can be analyzed by sectors, sections or quadrants of the cavity 120 of dishwasher 100, depending upon the location and arrangement of the plurality of sensors 300 mounted therein. In these embodiments the dish washer wash and rinse cycles may be modified during operation based upon the contents and location of dish wares 2, 3 in a given section or quadrant. In some embodiments the two-dimensional images captured by sensors 300 can be analyzed using an image analysis system such as a deep learning algorithm to create an edge profile of each piece of dish ware 2 located in cavity 120 and thereby provide an approximate location and an estimate of what type of dish ware 2, 3 is present. For example, certain edge profiles will positively identify a piece of dish ware as a glass bowl or dish while others will positively identify the dish ware 2 as a plastic container. Using the edge profiles of the various items in cavity 120 the analysis system may provide cycle modification instructions to dishwasher 100 processor 200 to modify the wash, rinse or dry cycles, select a particular cycle or action, or even add or omit a specified amount of detergent or rinse aid.

In some additional embodiments, the images analyzed by the analysis system during operation can provide edge profiles and position data to a deep learning algorithm that can identify a "flipped" or overturned container. These overturned items are particularly problematic in modern dishwashers 100 because they collect a volume of water that is needed for proper operation of the dishwasher 100 wash and rinse cycles. A deep learning algorithm can compare dishwasher 100 load images from sensors 300 taken just prior to wash cycle initiation with subsequent images taken during wash cycle operation. By comparing these images, the learning algorithm can discover when an item has been overturned and accordingly initiate instructions through server 260 to processor 200 to alert the user via operator interface 240 to take corrective action. Processor 200 may stop or suspend the wash cycle and then provide a visual or audible alarm via operator interface 240 to alert a user to open door 110 and rearrange the offending item before the cycle is permitted to continue. This feature of the invention is particularly useful when washing a rack or load of light weight items that tend to overturn and hold water.

In some embodiments of the invention where RF sensors 300 are utilized to capture dish ware 2, 3, image data, an RF sensor 300 module having a plurality of antenna pairs may be positioned and secured either on a gantry 340 or proximate one of the four corners of each dishwasher 100 rack 140. RF sensors 300 may then be calibrated by processor 200 by instructing RF module 300 to transmit and receive RF signals while racks 140 are empty, thereby creating a profile for an empty dishwasher 100. Once calibrated, RF modules 300 can then be used to detect and transmit the locations of various items placed on racks 140, since the data from the empty dishwasher can be filtered out of the received RF signals. As before, the data captured by RF modules 300 can be transmitted via communications interface 230 to a cloud server 260 for analysis with a deep learning algorithm. In some aspects and embodiments RF sensors 300 may utilize image processing using a coordinate system, for example a Cartesian or polar coordinate system, to determine and track exact dish ware 2, 3, position in cavity 120. Accordingly, the imaging data provided by RF sensor 300 embodiments can be analyzed by comparing the coordinates of the various objects identified over a predetermined time span, or even continuously.

In some aspects and embodiments RF sensors 300 may provide imaging data that can be analyzed to determine the type of dish ware 2, 3 present in racks 140. For example, RF signals detected from the presence of glass ware are substantially different that those received from the presence of plastic ware. Accordingly, the RF sensor 300 imaging data can be analyzed in remote server 260 to determine both a location and a dish ware material and use this data to adjust the wash cycle. Alternatively, and similar to some embodiments discussed herein above, a deep learning algorithm can compare dishwasher 100 load images (or imaging data) from RF sensors 300 taken just prior to wash cycle initiation with subsequent images taken during wash cycle operation. By comparing these "before" and "after" images, the learning algorithm can discover when an item has been overturned and accordingly initiate instructions through server 260 to processor 200 to alert the user via operator interface 240 to take corrective action. Processor 200 may then stop or suspend the wash cycle and then provide a visual or audible alarm via operator interface 240 to alert a user to open door 110 and rearrange the offending item before the cycle is permitted to continue.

In various aspects and embodiments sensors 300 may comprise a LIDAR array or arrays 300 for obtaining and providing imaging data for further analysis. In these embodiments the LIDAR sensors 300 may be mounted or secured in predetermined locations in dishwasher cavity 120 to obtain a complete image thereof or alternatively they may be mounted to a gantry 340 secured on back wall 124 that moves the LIDAR 300 sensor horizontally between, for example, an upper and lower rack 140. LIDAR sensors 300 can provide imaging data to processor 200 and remote server 260 representative of the surfaces of dish ware 2, 3 present in cavity 120. LIDAR sensors 300 capture imaging data that correspond to the surface characteristics of the dish ware 2, 3 such that an algorithm can determine what surface of a give item should be oriented upwardly or downwardly in a rack 140. Based on this imaging data from LIDAR sensor 300, the learning algorithm can discover when an item has been overturned and accordingly initiate instructions through server 260 to processor 200 to alert the user via operator interface 240 to take corrective action. Processor 200 may stop or suspend the wash cycle and then provide a visual or audible alarm via operator interface 240 to alert a user to open door 110 and rearrange the offending item before the cycle is permitted to continue.

In a yet further aspect and embodiment of the invention, a user can provide a remotely obtained image to processor 200 via communications interface 230 for analysis. In this embodiment an image or plurality thereof taken, for example, by a cell phone or other device capable of capturing and transmitting digital images to processor 200 and thus server 260. These remotely obtained images can then be analyzed as before utilizing a deep learning algorithm to determine whether any cycle adjustment or other action need be taken, either automatically through operation of processor 200 or through user action occasioned by a prompt via operator interface 240.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A system for sensing and monitoring the location and arrangement of dish ware on at least one rack inside the cavity of a dishwasher to modify a wash cycle, the system comprising:

a processor and concomitant data memory, the processor having a plurality of inputs and outputs for receiving and providing electrical signals to a plurality of electrical components of the dishwasher;

a user interface operatively coupled to the processor for accepting inputs from a user and providing dishwasher cycle selections to a user;

a Light Detection and Ranging (LIDAR) sensor disposed within the dishwasher cavity for capturing images of the dish ware, the LIDAR sensor having a data imaging output representative of surface characteristics of the dish ware operatively coupled to an input of the processor; and a communications interface operatively coupled to the processor that enables electronic communications from the processor to a remote server having an imaging data analysis system for analyzing the images to determine the position and composition of dish ware based on the imaging data, the communications interface further configured to receive electronic communications from the remote server to the processor from which wash cycle instructions are executed by the processor based upon the determined position and composition of dish ware.

2. The system of claim 1, further comprising a gantry disposed within the dishwasher cavity and having the LIDAR sensor secured to a movable portion thereof, wherein the processor is coupled to the gantry to control movement of the LIDAR sensor to a plurality of locations to capture images at the plurality of locations prior to and/or during the wash cycle.

3. The system of claim 1, wherein the processor is further configured to alert a user via the user interface of an overturned item of dish ware in an orientation capable of collecting water that is detected from at least one image captured by the LIDAR sensor.

4. The system of claim 3, wherein the image data analysis system is configured to detect the overturned item of dish ware in the orientation capable of collecting water from at least one of the images.

5. The system of claim 4, wherein the image data analysis system is configured to detect the overturned item of dish ware in the orientation capable of collecting water by comparing one or more images taken prior to the wash cycle with one or more subsequent images taken during wash cycle operation.

6. The system of claim 1, wherein the communications interface is configured to receive the wash cycle instructions from the remote server.

7. The system of claim 1, wherein the processor is configured to determine the wash cycle instructions based upon the electronic communications from the remote server.

8. A system for sensing and monitoring the location and arrangement of dish ware on at least one rack inside the cavity of a dishwasher to modify a wash cycle, the system comprising:
- a processor and concomitant data memory, the processor having a plurality of inputs and outputs for receiving and providing electrical signals to a plurality of electrical components of the dishwasher;
- a user interface operatively coupled to the processor for accepting inputs from a user and providing dishwasher cycle selections to a user;
- a sensor disposed within the dishwasher cavity for capturing images of the dish ware, the sensor having a data imaging output representative of the dish ware operatively coupled to an input of the processor;
- a gantry disposed within the dishwasher cavity and having the sensor secured to a movable portion thereof, wherein the processor is coupled to the gantry to control movement of the sensor to a plurality of locations to capture images at the plurality of locations prior to and/or during the wash cycle; and
- a communications interface operatively coupled to the processor that enables electronic communications from the processor to a remote server having an imaging data analysis system for analyzing the images to determine the position and composition of dish ware based on the imaging data, the communications interface further configured to receive electronic communications from the remote server to the processor from which wash cycle instructions are executed by the processor based upon the determined position and composition of dish ware.

9. The system of claim 8, wherein the processor is further configured to alert a user via the user interface of an overturned item of dish ware in an orientation capable of collecting water that is detected from at least one image captured by the sensor.

10. The system of claim 9, wherein the sensor is a Light Detection and Ranging (LIDAR) sensor having a data imaging output representative of surface characteristics of the dish ware.

11. The system of claim 8, wherein the gantry is disposed horizontally in the dishwasher cavity.

12. A system for sensing and monitoring the location and arrangement of dish ware on at least one rack inside the cavity of a dishwasher to modify a wash cycle, the system comprising:
- a processor and concomitant data memory, the processor having a plurality of inputs and outputs for receiving and providing electrical signals to a plurality of electrical components of the dishwasher;
- a user interface operatively coupled to the processor for accepting inputs from a user and providing dishwasher cycle selections to a user; and
- a sensor disposed within the dishwasher cavity for capturing images of the dish ware, the sensor having a data imaging output representative of the dish ware operatively coupled to an input of the processor;
- wherein the processor is further configured to alert a user via the user interface of an overturned item of dish ware in an orientation capable of collecting water that is detected from at least one image captured by the sensor.

13. The system of claim 12, wherein the sensor is a Light Detection and Ranging (LIDAR) sensor having a data imaging output representative of surface characteristics of the dish ware, wherein the overturned item of dish ware is detected in the orientation capable of collecting water based upon from at least one image captured by the LIDAR sensor.

14. The system of claim 12, further comprising a gantry disposed within the dishwasher cavity and having the sensor secured to a movable portion thereof, wherein the processor is coupled to the gantry to control movement of the sensor to a plurality of locations to capture images at the plurality of locations prior to and/or during the wash cycle.

15. The system of claim 12, further comprising a communications interface operatively coupled to the processor that enables electronic communications from the processor to a remote server having an imaging data analysis system for analyzing the images to determine the position and composition of the dish ware based on the imaging data, the communications interface further configured to receive electronic communications from the remote server to the processor.

16. The system of claim 15, wherein the image data analysis system is configured to detect the overturned item of dish ware in the orientation capable of collecting water from at least one of the images.

17. The system of claim 16, wherein the image data analysis system is configured to detect the overturned item of dish ware in the orientation capable of collecting water by comparing one or more images taken prior to the wash cycle with one or more subsequent images taken during wash cycle operation.

18. The system of claim 15, wherein the image data analysis system is configured to identify a predetermined type of dish ware by material.

19. The system of claim 15, wherein the analysis system comprises a deep learning algorithm.

20. The system of claim 12, wherein the processor is further configured to pause the wash cycle when the overturned item of dish ware in the orientation capable of collecting water is detected.

* * * * *